United States Patent [19]
Glabe et al.

[11] 3,734,672
[45] May 22, 1973

[54] EXTRUSION DIE FOR DOUGH

[75] Inventors: Elmer F. Glabe, Chicago; Perry W. Anderson, Niles; Stergois Laftsidis, Chicago, all of Ill.

[73] Assignee: Food Technology, Inc., Chicago, Ill.

[22] Filed: Oct. 18, 1971

[21] Appl. No.: 189,936

[52] U.S. Cl. ................................ 425/462, 425/461
[51] Int. Cl. ............................ A21c 3/00, A23p 1/00
[58] Field of Search ............... 425/464, 461, 462, 425/376, 382, 382.2

[56] References Cited

UNITED STATES PATENTS 2,302,555  11/1942  Klammroth ................ 425/464 X
2,677,335   5/1954  Maldari ...................... 425/464
3,408,433  10/1968  Brayford ................... 425/464 X
3,480,995  12/1969  Lenk ......................... 425/464
3,487,142  12/1969  Johnson et al. .......... 425/464 X Primary Examiner—J. Spencer Overholser
Assistant Examiner—Richard Bernard Lazarus
Attorney—Johnston, Root, O'Keeffe, Keil, Thompson and Shurtleff

[57] ABSTRACT

An extrusion die is provided for extruding a cup-shaped shell made from a dough, more specifically a simulated potato skin which is used to make a simulated stuffed baked potato.

4 Claims, 4 Drawing Figures

PATENTED MAY 22 1973 3,734,672

INVENTORS:
ELMER F. GLABE
PERRY W. ANDERSON
STERGOIS LAFTSIDIS
BY
Johnston, Root, O'Keeffe, Keil, Thompson, Shurtleff
ATT'YS

EXTRUSION DIE FOR DOUGH

BACKGROUND

In a copending application Ser. No. 177,861, filed Sept. 3, 1971 and assigned to the assignee of this application, we have described a composition and method for making a simulated stuffed baked potato. The preparation of such a simulated baked potato involves the preparation of a simulated potato skin or shell.

In the aforesaid patent application several methods are described for preparing the simulated potato skin or shell, one method being by extrusion through a die having a generally U-shaped extrusion orifice.

OBJECTS

One of the objects of the present invention is to provide a special type of extrusion die which is particularly useful for the extrusion of an extrudable dough to produce a simulated potato skin or shell that can be employed to prepare a simulated stuffed baked potato, all portions of which are edible.

Another object of the invention is to provide a method of making a dough shell having a cavity open at the top wherein the dough is extruded through a generally U-shaped opening under conditions such that it curls as it emerges from said opening.

THE DRAWINGS

Other objects and advantages of the invention will appear from the following description in conjunction with the accompanying drawing in which.

BRIEF SUMMARY OF THE INVENTION

In accordance with the invention an extrusion die for dough is provided comprising a plurality of passageways from the rear of said die to a slot extending across the face of said die, said slot being generally U-shaped with a substantial horizontal central section and an upwardly extending section on each end of said central section, said passageways leading to said upwardly extending sections of said slot being smaller in the areas adjacent said slot than said passageways leading to said horizontal section.

DETAILED DESCRIPTION OF THE INVENTION

Figure 1:
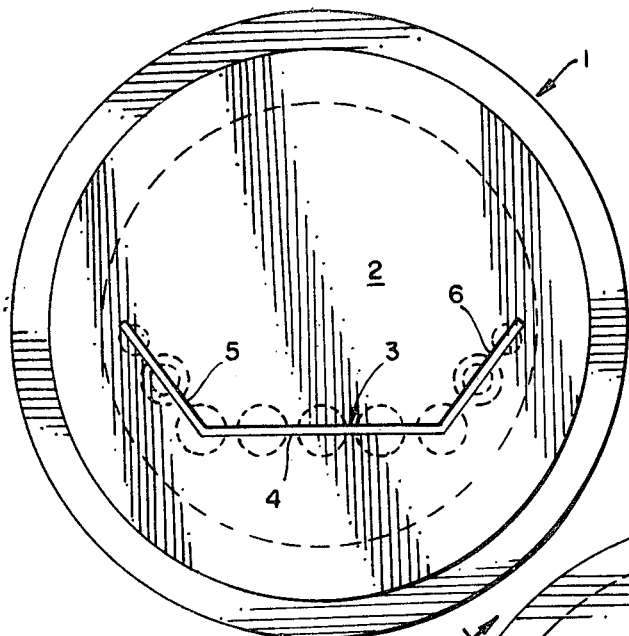
FIG. 1 is an elevational view of the face of an extrusion die illustrating an embodiment of the invention.
Figure 2:
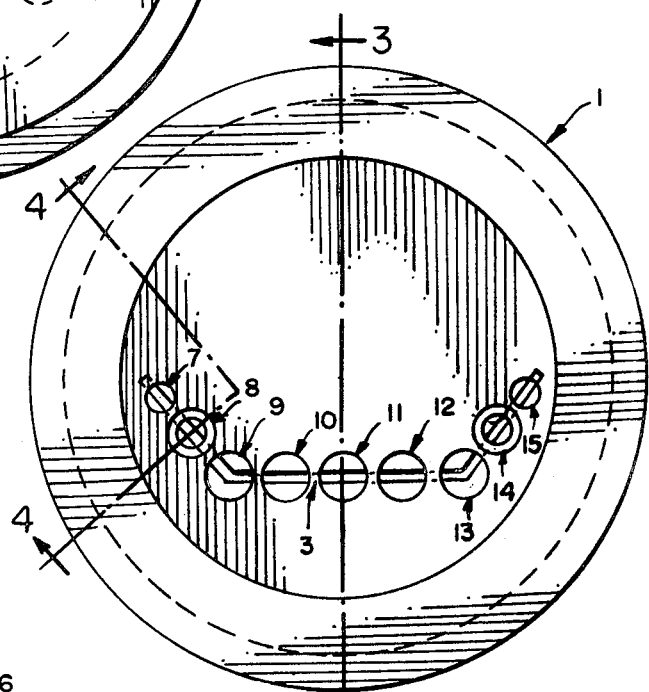
FIG. 2 is an elevational view of the rear of the die shown in FIG. 1.
Figure 3:
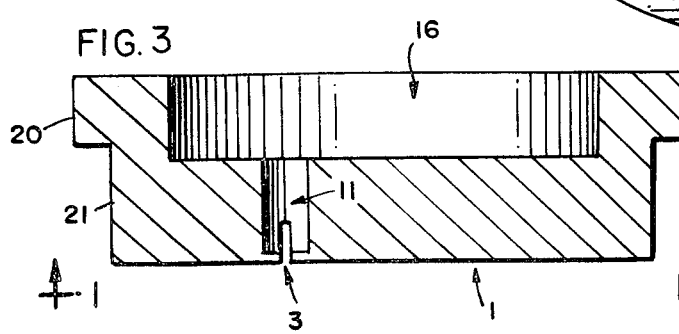
FIG. 3 is a cross sectional view taken along the line 3,3 of FIG. 2.

As shown in FIG. 1, the die 1 comprises an outer face 2 having therein an extrusion orifice or slot 3 which has a substantial horizontal central section 4 and two upwardly extending sections 5 and 6 which are slanted from the vertical. A plurality of passageways 7, 8, 9, 10, 11, 12, 13, 14, and 15 extend from the rear of the die 1 (see FIG. 2) to the slot 3 in the face of the die. These passageways open to a recessed portion 16.

Figure 4:
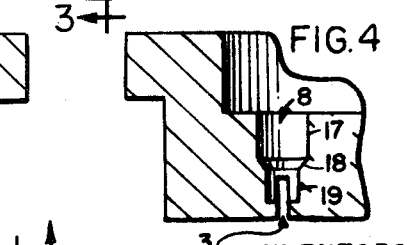
FIG. 4 is a cross sectional view taken along the line 4,4 of FIG. 2.

In the embodiment shown, all of the passageways are tubular and have a circular cross section. The passageways 9 to 13 have the same cross section throughout. Passageways 8 and 14 have the same diameter as passageways 9 to 13 in the inner portion 17 (FIG. 4) toward the rear of the die but have a constriction or offset portion 18 and a smaller diameter in the portion 19 which connects with the slot 3.

In a typical die, the sides of the slot 3 are substantially parallel and the width of said slot is usually within the range of one sixty-fourth inch of one-sixteenth inch, preferably approximately one thirty-second inch. The central section 4 is usually approximately 1—23/32 inches long. Each of the upwardly extending sections 5 and 6 is usually approximately thirty-one thirty-seconds inch long. The angles between said central section and said upwardly extending sections are usually each approximately 127°. The passageways 8 to 13 are usually approximately eleven thirty-seconds inch in diameter throughout. The passageways 8 and 14 are usually eleven thirty-seconds inch in diameter in the inner portion as at 17 in FIG. 4 and one-fourth inch in diameter in the outer portion as at 19 in FIG. 4. The passageways 7 and 15 are usually approximately seven thirty-seconds inch in diameter throughout.

The die 1 contains an outer flange 20 and an outer surface 21 which is offset inwardly and is adapted to be received in the end of the extruder portion of an extrusion apparatus which consists of an auger operating in a closely confined tube. The die 1 is held in the end of said tube in any suitable manner by means of a die holder, not shown.

A dough which can be prepared as described in the manner set forth in the aforesaid patent application when extruded from the die previously described tends to curl somewhat, thereby assuming the general contours of one-half of a natural baked potato section. The extruded dough can then be cut by an automatically operating knife blade into sections as determined by the operating speed of the knife blade. In the practice of the invention it is usually preferable to cut the sections of extruded dough so that the resultant pieces of dough are roughly cup-shaped and approximately 3 to 3½ inches in length and approximately 2½ to 3 inches in width. The features of the die permit the production of these cup-shaped pieces with very little additional hand work being necessary to make them into perfectly simulated potato skins.

An important feature of the invention resides in the size, curvature and relative relationship of the passageways 7 to 15 whereby as the dough enters the extrusion slot 3 a "drag" is provided which contributes to the curling of the dough upon emerging from the slot. Thus, "drag" is produced due to the fact that passageways 8 and 14 are restricted and more or less dishshaped and also due to the fact that passageways 7 and 15 as well as passageways 8 and 14 are smaller in cross section than passageways 9 to 13.

The invention is hereby claimed as follows:

1. An extrusion die for dough comprising a plurality of passageways from the rear of said die to a slot extending across the face of said die, said slot being generally U-shaped with a substantial horizontal central section and an upwardly extending section on each end of said central section, said passageways leading to said upwardly extending sections of said slot being smaller in the areas adjacent said slot than said passageways leading to said horizontal section.

2. A die as claimed in claim 1 in which said slot has substantially parallel sides and said passageways are tubular and have larger cross sectional dimensions than the distance between the parallel sides of said slot.

3. A die as claimed in claim 1 in which at least one of said passageways in each of said upwardly extending sections is constricted at a point intermediate between the rear of said die and said slot.

4. A die as claimed in claim 1 in which the width of said slot is approximately one thirty-second inch, the central section of said slot is approximately 1—23/32 inches long, each of the upwardly extending sections of said slot is approximately thirty-one thirty-seconds inch long, the angles between said central section and said upwardly extending sections are each approximately 127 degrees, the passageways leading to said central section of said slot are approximately eleven thirty-seconds inch in diameter, one of said smaller passageways adjacent the upper end of each of said upwardly extending sections is approximately seven thirty-seconds inch in diameter and another passageway intermediately disposed between said last mentioned passageway and said horizontal section in each of said upwardly extending sections is approximately eleven thirty-seconds inch in diameter at the rear of said die and is offset laterally inward to a diameter of approximately one-fourth inch at an intermediate point between the rear end of said passageway and said slot.

* * * * *